INVENTORS.
JOSEPH H. DUFF
ALFONSE J. SORIENTE
BY Hume, Groen, Clement & Hume
Attorneys.

United States Patent Office 3,397,788
Patented Aug. 20, 1968

3,397,788
WATER TREATING APPARATUS
Joseph H. Duff, Basking Ridge, and Alfonse J. Soriente, Gillette, N.J., assignors to Union Tank Car Company, Chicago, Ill., a corporation of New Jersey
Filed Oct. 21, 1965, Ser. No. 499,756
7 Claims. (Cl. 210—195)

ABSTRACT OF THE DISCLOSURE

In a water treatment apparatus having a settling zone, a mixing and recirculation zone and an uptake zone, the influent water and chemical treating agents are directed into the uptake zone, mixed with recirculating precipitates and hydraulically pumped upwardly to the mixing and recirculation zone. The bottom member of the uptake zone has an opening therein through which the recirculating precipitates are drawn from the settling zone.

---

The present invention relates to a water treating apparatus and, more particularly, to an apparatus for feeding the influent water into a water treating apparatus.

Heretofore water treating apparatus included a motor driven impeller to mix the raw influent water with the chemical treating agents and recirculating precipitates. The present invention provides an apparatus for feeding influent water into a water treating apparatus which eliminates the need for the motor driven impeller or, if the water treating apparatus has a motor driven impeller, increases the efficiency of the mixing afforded by the impeller.

It is an object of the present invention to provide a water treating apparatus.

It is a further object to provide an influent water feed means for a water treating apparatus.

It is another object to provide an influent water feed means which eliminates the need for the motor driven impeller in a water treating unit.

The invention, both as to its organization and method of operation, taken with further objects and advantages thereof, will be understood by reference to the following description taken in conjunction with the accompanying drawings, in which.

Figure 1:
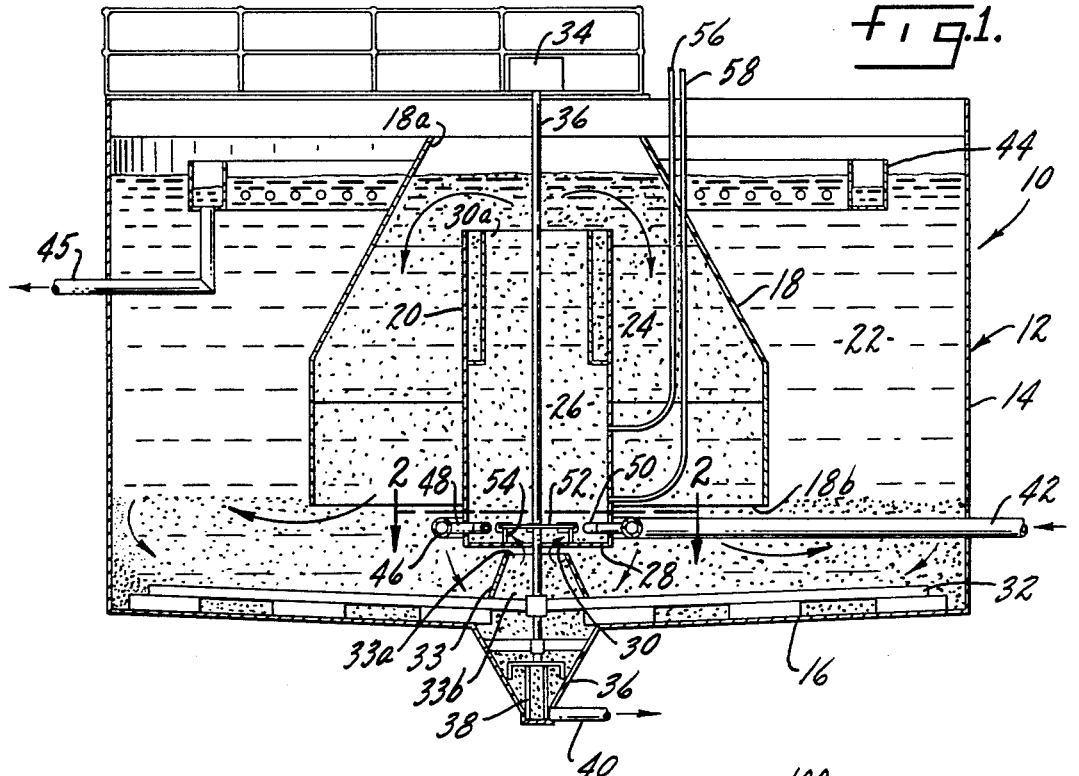
FIGURE 1 is a vertical cross-sectional view of a water treating apparatus embodying the features of the present invention.
Figure 2:
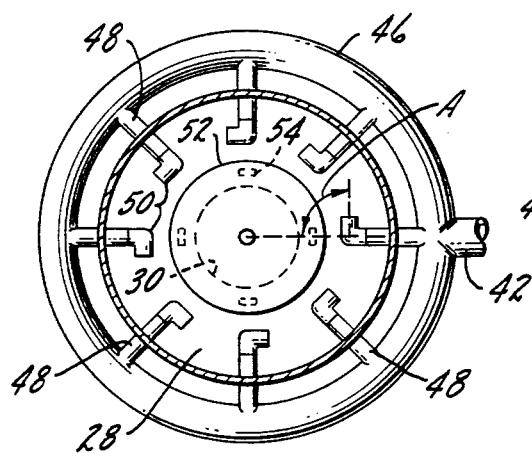
FIGURE 2 is a partial enlarged cross-sectional view of the water treating apparatus of FIGURE 1 taken along line 2—2 of FIGURE 1.

Referring now to FIGURES 1 and 2 there is illustrated a water treating apparatus, indicated generally by reference numeral 10, embodying the features of the present invention. The water treating apparatus 10 is of the type well known in the art for softening of water by the cold lime-soda ash process and for the clarification of waters containing suspended solids, color and organic impurities by coagulation with alum or ferric sulfate or other coagulants. Coagulation and softening may be carried out simultaneously in this type of water treating apparatus. Graver Water Conditioning Company's "Reactivator," described and illustrated in their Bulletin WC–103D, dated 1963, is exemplary of this general type of apparatus.

Color, turbidity, organic matter and similar impurities are removed from water by coagulants such as alum, ferric sulfate or the like. These compounds are acidic and react with the alkalinity in the water or with alkaline compounds, such as lime or soda ash, to form voluminous insoluble precipitates (hydrates). The precipitates have a tremendous surface area on which the dissolved or colloidally dispersed impurities are absorbed. The suspended impurities are surrounded by the gelatinous hydrates and become part of the precipitate.

To soften water by this process, lime (calcium hydroxide) is added to precipitate the calcium bicarbonate as calcium carbonate and the magnesium salts as magnesium hydroxide. Soda ash (sodium carbonate) is added to react with the calcium chloride and calcium sulfate originally present in the water as well as that formed by the reaction of lime with magnesium chloride and sulfate. The reaction of sodium carbonate with these salts forms calcium carbonate. Thus the hardness (calcium and magnesium salts) originally present in the water is partially removed as the slightly soluble compounds, calcium carbonate and magnesium hydroxide, precipitate.

Usually a coagulant such as alum, sodium aluminate or ferric sulfate is added in the treatment to assist in the separation of the turbidity and precipitates formed from the water. If sterilization and reduction in organic matter are required, chlorine is also used in the treatment. By suitable modification in the chemical treatment, silica reduction can be obtained.

The water treating apparatus 10 comprises an open tank 12 having a cylindrical wall 14 with a bottom 16. Mounted therein is an inverted, generally conical-shaped partition member 18 which has an upper opening 18a and a lower opening 18b. A generally cylindrical uptake member 20 is mounted within the partition member 18. As used herein generally cylindrical includes substantially regular polygonal shapes having more than four sizes. The uptake member 20 has an upper opening 30a and a closed bottom 28 with an opening 30 substantially in the center thereof.

The partition member 18 and the tank 12 form a settling zone 22. The uptake member 20 and the partition member 18 form an annular mixing and recirculation chamber 24. The settling zone 22 communicates with the mixing and recirculation chamber 24 through the lower opening 18b of the partition member 18. The uptake member 20 forms an uptake zone 26 which communicates at its upper opening 30a with the mixing and recirculation zone 24. The uptake zone 26 communicates with the lower portion of the settling zone 22 through the opening 30.

Mounted within the lower portion of the settling zone 22 is a scraper 32 which covers the entire bottom 16 of the tank 12. The scraper 32 is driven by a motor 34 mounted on the top of the tank 12 through a drive shaft 36 which extends through the uptake zone 26 as illustrated in FIGURE 1.

A hollow, inverted frusto-conical funnel member 33 is attached to the scraper 32 and has upper and lower openings, 33a and 33b, respectively. The lower opening 33b is directed toward a sludge pit 36 and the upper opening 33a is directed toward the opening 30 in the bottom of the uptake member 20. Recirculated precipitates pass upwardly through the funnel member 33 into the opening 30 and the bottom of the uptake zone 26.

The sludge pit 36 is positioned centrally in the bottom 16 of the tank 12 and is below the funnel member 33. Sludge pit thickeners 38 are rotatably driven through the shaft 36 by the motor 34 with the scrapers 32. Sludge is removed from the sludge pit 36 through sludge removal line 40 as is well known in the art.

Water to be treated enters the water treating apparatus 10 through inlet line 42. Treated effluent is recovered in the annular-shaped collector trough 44 and withdrawn through an effluent outlet line 45.

Referring now specifically to the influent water feed means of the present invention, the raw water inlet line 42 communicates with water inlet manifold 46. In this instance the manifold 46 comprises an annular-shaped pipe extending around the periphery of the uptake member 20. Extending radially inwardly from the manifold 46 are a plurality of lines 48 which extend through the uptake member 20 into the uptake zone 26. Each of these lines 48 terminates with a nozzle 50 which properly directs the influent water into the uptake zone 26 to cause the body of water therein to rotate and therefore to pump the water out of the upake zone 26 and to cause recirculation within the water treating apparatus 10. A single line 48 with a nozzle 50 will suffice, but it is preferred to employ a plurality of lines 48 and nozzles 50 as illustrated in the drawings. The nozzles 50 are preferably adjustable so that they may be adjusted in the horizontal plane as well as turned upwardly or downwardly with respect to the horizontal plane. With respect to the nozzles being turned upwardly and downwardly, it is preferred that the influent water be directed into the uptake zone 26 within about 45° of the horizontal plane though under certain circumstances the water could be directed downwardly at an angle as large as 90° from the horizontal (i.e., straight down) and upwardly at an angle as large as 90° from the horizontal (i.e., straight up). With respect to the position of the nozzle in the horizontal plane, it is preferred that the angle between the direction of the influent water from the nozzle with a radius of the uptake zone 26 to the nozzle angle (A in FIGURE 2) be within the range of about 35° to 145° though in certain instances it may be desired to decrease the angle to as small as 0° or increase the angle to as large as 180°. In FIGURE 2 the nozzles are positioned such that the angle is 90°.

Though not required, it is preferred as illustrated in FIGURES 1 and 2, to have a plate member 52 supported by legs 54 above the opening 30 in the bottom of the uptake member 20. The plate member 52 is level with or slightly above the nozzles 50 and improves the efficiency of the pumping action effected by the nozzles 50.

The nozzles 50 direct the inlet water into the uptake zone 26 in such a direction to cause rotation of the body of water therein and therefore to pump the water upwardly into the mixing and recirculation zone 24 and to cause recirculation of water and precipitates. The rotation of the water causes a high pressure zone toward the periphery of the uptake zone 26 and a low pressure zone toward the center or longitudinal axis of the uptake zone 26. In this manner, recirculated precipitates from the settling zone 22 are mixed with the influent water in the uptake zone 26. Chemical treating agents are added to the uptake zone through lines 56 and 58 and are mixed with the influent water in the uptake zone 26, also.

During operation, the raw or influent water enters the water treating apparatus through line 42 and passes into the uptake zone 26 through the manifold 46, lines 48 and nozzles 50. The influent water is injected into the uptake zone 26 in the manner previously described to cause the water to rotate or move in a circular path. As the influent water rotates it is mixed with recirculated precipitates passing upwardly through the opening 30 in the bottom of the uptake member 20. The influent water is also mixed with the chemicals being added through lines 56 and 58 and additional precipitates are formed. The influent water is thereby pumped upwardly through the uptake zone 26 and passes over the top of the uptake member 20 into the mixing and recirculation chamber 24 where further mixing of the water, solids and chemicals occurs.

A substantial part of the water and suspended precipitates pass through the funnel member 33 and enter the uptake zone 26 through the opening 30 to be recirculated in the manner previously described and as is well known in the art. Part of the water enters the settling zone 22 and rises toward the effluent collector 44. Precipitates and sludge settle out and fall to the bottom 16 of the tank 12.

The settled precipitates or sludge are moved continuously along the floor 16 toward the center of the apparatus by means of the slowly rotating scraper 32 which covers the entire floor area. The accumulations of precipitates are transferred to the sludge pit 36 where they settle quiescently. The sludge is removed through line 40 and passed to waste.

The clear water rises to the collector trough 44 and is removed from the water treating apparatus 10 through the outlet line 45.

Figure 3:
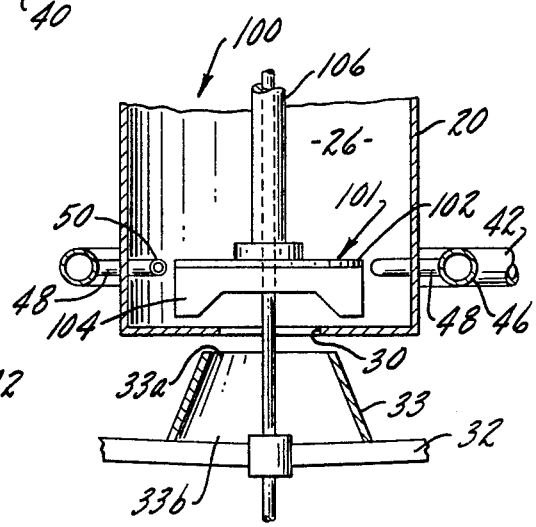
FIGURE 3 is a fragmentary vertical cross-sectional view of a modified water treating apparatus embodying the features of the present invention.

Referring now to FIGURE 3 there is illustrated a portion of a modified water treating unit 100 embodying the features of the present invention. In this instance, as is customary with known water treating apparatus of this type, the uptake zone 26 has a motor driven impeller, indicated generally by reference numeral 101, comprising a plate 102 and impeller blades 104. The impeller 101 is driven by a motor (not shown) through a shaft 106 and rotates in the same direction as the circular flow path of the influent water in the uptake zone 26. In all other respects the water treating unit 100 is the same as the water treating apparatus 10 described hereinbefore with respect to FIGURES 1 and 2.

The water treating apparatus 100 is exemplary of the use of the influent feed means of the present invention upon existing water treatment apparatus. The inlet water feed means, described hereinbeforein detail, enhances the pumping action of the impeller 100 and causes additional mixing of the inlet water with the recirculated precipitates and chemical agents in the uptake zone 26. The overall operation of the water treating apparatus 100 is otherwise the same as the water treating apparatus 10 discussed hereinbefore.

The impeller 101 may be used to increase the efficiency of the pumping action of the nozzles 50 in the water treating apparatus of FIGURE 3 even if the impeller 101 is not driven by a motor but is free to rotate with the rotating body of water in the uptake zone 26.

The water treating apparatus of the present invention may be used to treat municipality water, cooling tower make-up water, boiler feed make-up water, white water for paper processing and the like as will be understood by those with ordinary skill in the art.

While the embodiments described herein are at present considered to be preferred, it will be understood that various modifications and improvements may be made therein and it is intended to cover in the appended claims all such modifications and improvements as fall within the true spirit and scope of the invention.

What is claimed is:

1. In a water treating apparatus having means forming a settling zone, means forming a mixing and recirculation zone and means forming an uptake zone, the uptake zone having a closed bottom member with an opening substantially in the center thereof through which said uptake zone communicates with said mixing and recirculation zone and said settling zone, and the upper portion of said uptake zone communicating with said mixing and recirculation zone, said mixing and recirculation zone communicating with said settling zone, means to supply a chemical treating agent to said uptake zone to form precipitates therein, means to withdraw effluent from the settling zone, the improvement comprising feed means to pass influent water into said uptake zone, said feed means to pass influent water into said uptake zone being located above said bottom member, said feed means being so constructed and arranged and being the sole means for causing said water in said uptake zone to rotate therein and to be pumped upwardly from said uptake zone and for recirculating precipitates entering said uptake zone from said settling zone through said opening in the bottom member thereof, said feed means to pass influent water into said uptake zone being connected to a supply of influent water.

2. In the apparatus of claim 1 wherein said feed means to pass influent water into said uptake zone comprises a plurality of nozzles directing said influent water into said uptake zone above said bottom member.

3. In the apparatus of claim 2 wherein a plate member is mounted above said opening in said bottom member of said uptake zone.

4. In a water treating apparatus having means forming a settling zone, means forming a mixing and recirculation zone and means forming an uptake zone, the uptake zone having a closed bottom member with an opening substantially in the center thereof through which said uptake zone communicates with said mixing and recirculation zone and said settling zone, and the upper portion of said uptake zone communicating with said mixing and recirculation zone, said mixing and recirculation zone communicating with said settling zone, means to supply a chemical treating agent to said uptake zone to form precipitates therein, means to withdraw effluent from the settling zone, the improvement comprising a plurality of feed nozzles in said uptake zone located above said bottom member, said nozzles positioned and arranged to direct influent water into said uptake zone in a direction within an angle of about 35° to 145° with a radius to said nozzle and within about 45° of a horizontal plane through said nozzles, said nozzles being so constructed and arranged and being the sole means for causing said water in said uptake zone to rotate therein and to be pumped upwardly from said uptake zone and for recirculating precipitates entering said uptake zone from said settling zone through said opening in the bottom member thereof, said nozzles being connected to means to supply influent water to said nozzles.

5. In the water treating apparatus of claim 4 wherein a plate member is mounted within said uptake zone above said opening, said nozzles being about at the level of said plate.

6. In a water treating apparatus having means forming a settling zone, means forming a mixing and recirculation zone and means forming an uptake zone, the uptake zone having a closed bottom member with an opening substantially in the center thereof through which said uptake zone communicates with said mixing and recirculation zone and said settling zone, and the upper portion of said uptake zone communicating with said mixing and recirculation zone, said mixing and recirculation zone communicating with said settling zone, means to supply a chemical treating agent to said uptake zone to form precipitates therein, inlet means to deliver influent water to said uptake zone, means to withdraw effluent from the settling zone, a motor driven impeller means mounted in said uptake zone above said opening, the improvement comprising nozzle means in said uptake zone connected to said inlet means, said nozzle means being located above said bottom member and causing said water to rotate in said uptake zone and to be pumped upwardly therefrom, said nozzle means being positioned about level with said impeller means, said nozzle means directing influent water into said uptake zone in a direction within an angle of about 35° to 145° with a radius to said nozzle means and within about 45° of a horizontal plane through said nozzle means, said impeller being driven in the same direction as the flow of influent water in said uptake zone from said nozzle.

7. In a water treating apparatus having means forming a settling zone, means forming a mixing and recirculation zone and means forming an uptake zone, the uptake zone having a closed bottom member with an opening substantially in the center thereof through which said uptake zone communicates with said mixing and recirculation zone and said settling zone, and the upper portion of said uptake zone communicating with said mixing and recirculation zone, said mixing and recirculation zone communicating with said settling zone, means to supply a chemical treating agent to said uptake zone to form precipitates therein, an inlet means to deliver influent water to said uptake zone, means to withdraw effluent from the settling zone, the improvement comprising a freely rotatable impeller means mounted in said uptake zone, nozzle means in said uptake zone above said bottom member connected to said inlet means, said nozzle means being located above said bottom member and causing said water to rotate in said uptake zone and to be pumped upwardly therefrom, said nozzle means being positioned about level with said impeller means, said nozzle means directing influent water into said uptake zone in a direction within an angle of about 35° to 145° with a radius to said nozzle means and within about 45° of a horizontal plane through said nozzle means.

References Cited

UNITED STATES PATENTS

| 1,639,373 | 8/1927 | Glover | 210—519 |
| 2,348,123 | 5/1944 | Green et al. | 210—208 X |
| 2,353,358 | 7/1944 | Prager | 210—219 X |
| 2,429,315 | 10/1947 | Green | 210—208 |
| 2,678,914 | 5/1954 | Kalinske | 210—219 |
| 2,296,437 | 9/1942 | Green | 210—60 X |

FOREIGN PATENTS

| 197,290 | 4/1958 | Austria. |
| 227,622 | 5/1963 | Austria. |

REUBEN FRIEDMAN, *Primary Examiner.*

J. L. DE CESARE, *Assistant Examiner.*